Fig. 2.
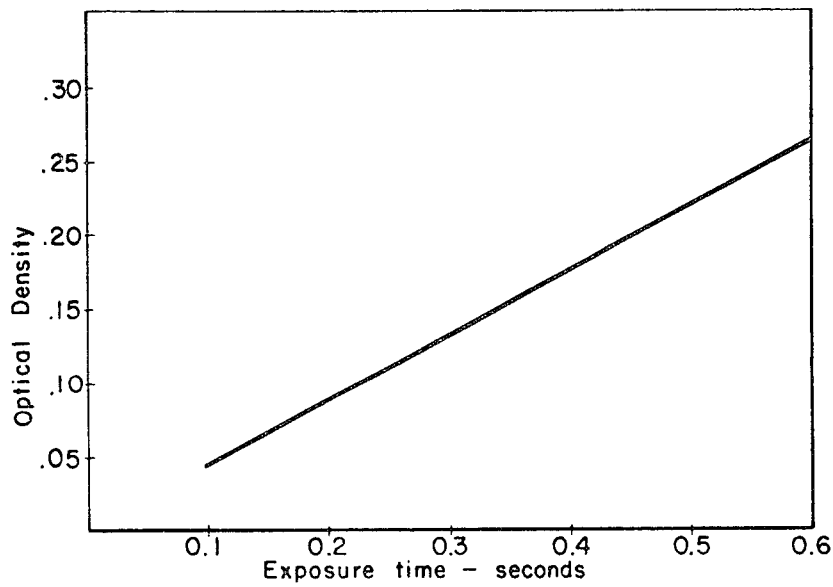
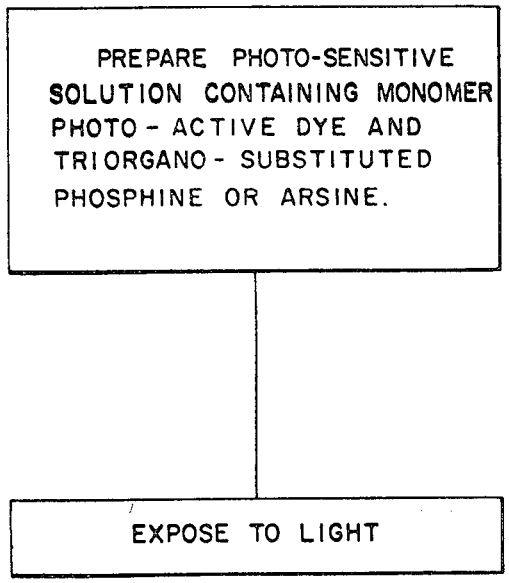
Fig. 1.
John B. Rust,
INVENTOR.

United States Patent Office 3,649,495
Patented Mar. 14, 1972

3,649,495
PHOTOPOLYMERIZATION OF VINYL MONOMERS USING A PHOTO-OXIDANT DYE-TRIORGANO PHOSPHINE OR ARSINE CATALYST SYSTEM
John B. Rust, Los Angeles, Calif., assignor to Hughes Aircraft Company, Culver City, Calif.
Continuation-in-part of application Ser. No. 483,986, Aug. 31, 1965. This application May 15, 1969, Ser. No. 824,903
Int. Cl. B01j 1/00; C08f 1/00
U.S. Cl. 204—159.24
14 Claims

ABSTRACT OF THE DISCLOSURE

A method of photopolymerization of a polymerizable vinyl monomer system with a photo-redox catalyst system utilizing in combination a photo-oxidant with a triorgano phosphine and triorgano arsine and compositions thereof. The photo-oxidant is reacted with the phosphine and/or arsine to produce a free-radical by withdrawing and transferring an electron to promote photopolymerization of the vinyl system.

This is a continuation-in-part of applicant's application Ser. No. 483,986 filed Aug. 31, 1965, now abandoned.

The present invention relates to solid polymers and to the formation thereof by a process of photo-induced polymerization of unsaturated polymerizable monomers in the presence of a novel catalyst system. More particularly, the present invention relates to a unique photo-redox catalyst system which through the action of visible light becomes a highly efficient initiator of addition polymerization.

The polymerization of monomers such as vinyl compounds by subjecting them to elevated temperatures is well known. The polymerization of certain monomeric compounds by subjecting them to the action of optical energy of ultraviolet wavelengths, for example, is also known. In the polymerization of vinyl monomers by ultraviolet radiation, for example, a photon is absorbed by the vinyl monomer which, thereupon, itself becomes a free-radical for the initiation of chain growth. Dye-stuffs also have been reported to be useful as photo-sensitizers for the actinic light polymerization of certain vinyl monomers. Usually, however, such photopolymerization, if practiced without the use of catalyst, proceeds at an extremely slow rate often requiring exposure of an hour or more. Hence, the art of photopolymerization has turned to the use of catalysts and promoters of the desired reactions in order to obtain faster reaction times and complete polymerization. Typical or this prior art effort is the catalytic photopolymerization process described in U.S. Pat. 3,075,907 to S. Levinos who teaches the use of a nonoxidizing silver compound catalyst which is effective to achieve such polymerization under the influence of visible radiation. While the process of Levinos constitutes a valuable contribution to the art of photopolymerization, the polymerization times reported in his patent still leave much to be desired. It will be understood that the "polymerization time" as used herein includes the time required for polymerization after the initiation thereof as well as what is called the "induction period," which is the interval of time between the first exposure of the photosensitive system to radiation and the initiation of polymerization.

Although many interesting and valuable processes for polymerizing vinyl monomers have been described for bringing about photo-induced polymerization, all of the processes of which I am aware require an inordinately large photon flux; that is, substantially high light intensities are required. The reason for this, possibly, lies in the poor over-all quantum efficiency resulting from low reactivity of the free-radicals that are produced, or side reactions which lead to rapid destruction of free-radicals. For these reasons, prior art processes have not been useful in the production of solid addition polymers at low light levels such as are found in a normally lighted room or in shady areas out-of-doors, unless impractically long exposure periods are employed.

The use of redox catalytic systems to produce free radicals by oxidation of a suitable reducing agent or by the reduction of a suitable oxidizing agent is known. These redox catalytic systems are practiced without the use of light and have been especially useful in the production of synthetic rubbers and the like. However, with the redox catalyst systems of the prior art, it has been necessary to batch-mix the raw materials since there is no way to inhibit polymerization once mixing has occurred. In my co-pending application, Ser. No. 450,397 filed Apr. 23, 1965, now abandoned, entitled "Photopolymers and the Process of Making Same" and assigned to the instant assignee, I have disclosed and described novel materials which may be continuously mixed and with which it is possible to control the polymerization as desired simply by the application or nonapplication of radiation or light to the mixture.

The catalyst system described in my aforementioned co-pending application includes: (1) an organic compound, called a photo-oxidant, which is capable of efficiently absorbing a photon having an energy in the visible portion of the spectrum and which, after absorption of the photon, attains an activated state corresponding to an oxidant or electron acceptor; and (2) an organic sulfinic compound capable of reacting with the photo-oxidant to form a free radical by electron transfer to the photo-oxidant. The present invention relates to a new catalyst system which, while also including the organic compounds or "photo-oxidants" described in my co-pending application, utilizes either triorgano-substituted phosphine or arsine, or compounds thereof which are capable of reacting with the photo-oxidant to form a free radical by electron transfer to the photo-oxidant.

As used herein and in the appended claims, the terms "photo-oxidant" or "photo-active dye" means any organic compound which in its ground or unilluminated state is inactive and incapable of functioning effectively as an oxidant but which can acquire an oxidation potential or the ability to function as an oxidant when subject to visible light of a wavelength in the range of from about 3800 to about 7200 A. The phrases "photo-oxidant" or "photo-active dye" thus are employed as more convenient expressions in preference to "photo-oxidizable" or "photo-activatable" and are intended to refer to the appropriate organic materials whether they are in the ground or activated state unless the context indicates otherwise. Also as used herein, the phases "triorgano-substituted phosphine" or "triorgano-substituted arsine" include phosphine and arsine per se as well as compounds thereof and the phrase "triorgano-substituted phosphine or arsine" means that both the phosphine and arsine are triorgano-substituted compounds. This newly discovered catalyst system possesses the essential features of a redox catalyst system, except that the oxidant component is created by photo-activation of a normally inactive organic compound. This unique catalyst system is therefore called a photo-redox catalyst system.

I have discovered that polymerizable monomeric vinyl compounds may be directly photopolymerized in extremely short periods of time, say of less than 30 seconds, by exposing a solution or dispersion of the monomer to the action of radiation within a wavelength range of from 3800 to 7200 angstroms while using the novel photo-redox catalyst system of the invention. I have found that the free-radicals generated by withdrawal of an electron from the triorgano-substituted phosphine or arsine compounds are characterized by a very high degree of reactivity and are extremely active initiators of polymerization. In the dark, however, the photo-redox catalyst system of the present invention is completely passive. No polymerization whatsoever can be detected on storage for long periods in the dark. However, upon exposure to visible light of even relatively low levels of intensity, rapid polymerization of appropriate monomers takes place. With properly prepared mixtures of appropriate ingredients, substantial polymerization can be demonstrated with less than one second exposure to diffuse room illumination.

Hence, it is an object of my invention to form solid polymers directly by the irradiation of monomers containing vinyl groups in the presence of a photo-redox catalyst system comprising a photo-oxidant or photoactive dye and a triorgano-substituted phosphine or arsine.

In general, the process of the present invention is carried out by mixing appropriate quantities of the monomer and the photo-active dye in one solution, with or without a cross-linking agent, and then providing a reaction mixture by mixing appropriate quantities of this solution with a solution of a triorgano-substituted phosphine or arsine. The reaction mixture is then ready for photo-polymerization by exposing the same to appropriate radiation in the visible portion of the spectrum. In an alternate procedure, the process of the present invention is carried out by mixing appropriate quantities of monomer in one solution and appropriate quantities of the photo-active dye and the triorgano-substituted phosphine or arsine in a second solution, and then mixing the two solutions in the desired ratio to produce a reaction mixture which is ready for photo-redox polymerization. The mechanism of the photopolymerization process of the present invention appears to function as follows. Upon irradiation with optical energy the dye becomes activated and capable of functioning as an oxidant of materials, particularly the triorgano-substituted phosphine or arsine, which the dye in its inactivated state is incapable of oxidizing. Such dyes are identified herein as photo-active dyes or simply as a photo-oxidant. The photo-active dye reacts with the triorgano-substituted phosphine or arsine to produce a catalytic free-radical which functions as an extremely active and efficient initiator for polymerization of the vinyl monomer. One outstanding feature of the photo-redox catalyst system of the present invention is the extreme rapidity of the photochemical polymerization reactions. In many instances there has been no measurable induction period involved at all. Another outstanding feature is the low level of light intensity to which the catalyst system of the invention responds.

The process of the invention will be described in greater detail by reference to the drawings in which:

FIG. 1 is a flow chart representation of the process of the invention; and

FIG. 2 is a graphical representation of the optical density of polymers formed according to the present invention versus the exposure time thereof to light.

An organic compound which absorbs radiation in the visible portion of the spectrum must be colored and therefore, by definition, it is classed as a dye. I have found that the class of organic compounds that absorb radiation in the visible portion of the spectrum and which attain a photo-oxidant or photo-activated state, capable of reacting with a triorgano-substituted phosphine or arsine to produce a free-radical by withdrawing and transferring an electron, is typified by the quinoidal dyes such as phenothiazine dyes, phenazine dyes, phenoxazine dyes, acridine dyes, pyronine dyes, xanthene dyes, and the like. A more general characteristic of the photo-active organic compounds suitable for use in the process of the present invention is an oxidation potential in the visible light-activated state, but not in the ground state of the dye, which permits the spontaneous removal of an electron from the triorgano-substituted phosphine or arsine, thus resulting in the formation of a highly reactive, polymerization-initiating free-radical. Dyes suitable for use in the process of this invention preferably have the structural formula:

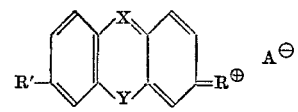

where R carries a positive charge and is an imonium, alkylimonium, dialkylimonium, or oxonium group; R' is hydrogen or an amino, alkylamino, dialkylamino, or hydroxyl group; X is nitrogen or substituted carbon; Y is sulfur, oxygen or substituted nitrogen; and $A^\ominus$ is any suitable anion. It is to be understood that the double bonds, and positive charge on R, may rearrange to a more stable configuration without in any way affecting the validity or representation of the above structural formula.

Although a very large number of dyes, all possessing the above structural formula, are useful in this invention, some show greater activity than others. I have found that the following dyes possessing this structure are typical in their activity and representative of the photo-oxidants of this invention: methylene blue, thionine, azure B, rose bengal, phenosafranine, acridine orange, riboflavin, fluorescein, erythrosin B, safranine O, pyronine B, capri blue, azure A, resorufin and the like. However, it has been found that the dye, thioflavin T, which does not have this general structural formula, also is suitable for use in the practice of this invention. Hence, the practice of the invention is not necessarily limited to dyes having the structural formula given.

In the process of the invention, when a phenothiazine dye is employed, the formation of a dye semiquinone is a by-product of the reaction between the photothiazine dye and the triorgano-substituted phosphine or arsine. However, the activity of the free-radical formed in this reaction is so great as to dwarf any polymerization-initiating properties of the semiquinone although such action is not detrimental to the polymerization process.

The process of the present invention has also been found to be more tolerant of excess oxygen than the photopolymerization processes of the prior art. It is known that certain impurities such as oxygen in these processes act as polymerization inhibitors necessitating an "induction period" during which the polymerization-initiator must react with these impurities until they are consumed and polymerization can proceed. In the process of the present invention, however, greater amounts of oxygen, which is usually the principal impurity present, can be tolerated because the initiator which is formed by the photochemical reaction is so active that only a fraction of the initiator is required to initiate polymerization even in the presence of excess oxygen.

The process of the present invention may be made specifically sensitive to a predetermined optical frequency or band of frequencies because the catalyst system of the process of the invention includes a photosensitive dye. Thus, while one of the purposes of the dye is to react under the influence of and in response to radiation with the triorgano-substituted phosphine or arsine compound to produce the polymerization-initiating free-radical, advantage may also be taken of the fact that such photo-sensitive dyes are characterized by having a frequency-dependent maximum photon absorption efficiency. Hence, by selecting the proper dye, the photopolymerization process of the invention can be tailored to respond to a desired optical frequency or frequencies.

The triorgano-substituted phosphine and arsine or compounds thereof suitable for use in the practice of the present invention have the general formula:

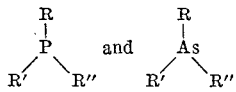

where R, R' and R" may be alkyl, aryl, aralkyl or alkaryl groups.

As the triorgano-substituted phosphine or arsine for use in the present invention, I may employ, for example, such appropriate phosphine compounds as: tributyl phosphine, triphenyl phosphine, dibutylphenyl phosphine, methyl diphenyl phosphine, and methyl butylphenyl phosphine, for example. Examples of appropriate tri-organo-substituted arsine compounds are: triphenyl arsine, methyl diphenyl arsine, trioctylarsine, dibutylphenyl arsine and methylbutyl-phenyl arsine, and like mixtures.

Among the polymerizable unsaturated organic monomers, certain classes of monomers appear to be more satisfactory than others for adapting the photo-redox catalyst system to a photographic technique. In general, polymerizable monomers useful in the present invention are termed herein as vinyl monomers and are typified by: acrylamide, acrylonitrile, N - (hydroxyethyl)acrylamide, methacrylic acid, acrylic acid, calcium acrylate, barium acrylate, methacrylamide, vinyl acetate, methyl methacrylate, methyl acrylate, ethyl acrylate, vinyl benzoate, vinylpyrrolidone, vinyl methyl ether, vinyl butyl ether, vinyl butyrate, styrene, butadiene, vinyl chloride, vinylidene chloride and the like.

To obtain a useful photographic effect, it is highly desirable to utilize monomers having a functionality greater than two, so that highly cross-linked polymers which are insoluble and infusible are obtained at a low degree of conversion. It is known that the greater the functionality of a monomer, the lower the degree of conversion at the gel point (or the point at which insolubility of the polymer sets in). This being the case, a discernible photographic image is obtainable by the process of the present invention at low light levels and in short periods of time when monomers of high functionality are employed. Monomers having a functionality higher than two are typified by: N,N'-alkylenedisacrylamides, secondary acrylamides, tertiary acrylamides, di- or trivalent metal salts of acrylic or methacrylic acid and the like. Such polyfunctional compounds are generally designated in the art as "cross-linking" agents and suitable examples for use in the process of the present invention are:

(1) Alkylenebisacrylamides and their derivatives having the general formula:

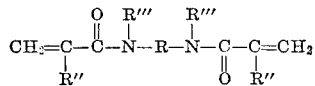

(2) Secondary acrylamides or derivatives thereof having the general formula:

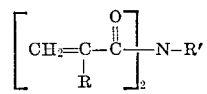

(3) Tertiary acrylamides or derivatives thereof having the general formula:

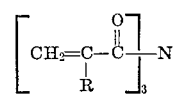

(4) And the divalent or trivalent metal salts of acrylic acid or its derivatives having the general formula:

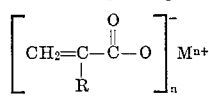

where $n$ is greater than one and M may be calcium, barium, strontium, magnesium, zinc or aluminum, and where the groups R, R', R" and R''' in all of the above formulas are alkyl, aryl, aralkyl or alkaryl groups such as methyl, ethyl, propyl, butyl, phenyl, benzyl, tolyl and the like, for example, with R in (1) being an alkylene group.

Furthermore, mixtures of monomers having a functionality of two with those having a functionality greater than two will have an average functionality greater than two and therefore will yield cross-linked, insoluble polymers. An example of such a mixture is acrylamide and N,N'-methylene-bisacrylamide.

Only catalytic amounts of the triorgano-substituted phosphine or arsine are needed in the photo-redox catalyst system of the present invention for photopolymerization. Thus, photo-redox polymerization, according to the present invention, may be achieved by using concentrations of the triorgano-substituted phosphine or arsine as small as $10^{-6}$ moles per liter. Hence, when measured against the quanity of the monomer, the amount of the triorgano-substituted phosphine or arsine catalyst can be exceedingly small. Higher concentrations may result in somewhat accelerated rates of photopolymerization. The minimum required concentration of photo-active dye, which is also a part of the catalyst system of the present invention and which is used in conjunction with the triorgano-substituted phosphine or arsine is approximately $10^{-7}$ moles per liter. As the dye concentration is increased above this minimum concentration, the sensitivity increases; however, the sensitivity increases; however, the sensitivity may pass through a maximum as the dye concentration is further increased so that it may be desirable to avoid high dye concentrations (i.e., $10^{-2}$ moles per liter or more), especially when the photo-sensitive solutions to be polymerized is of greater thickness than a very thin film. Since the optical properties of the dye are dependent upon the quantities present as well as upon the intensity of the radiation employed, the criteria for determining the proper or practical quantities of dye and of triorgano-substituted phosphine or arsine to be employed will be governed by considerations other than just the amount needed for catalyzing the photopolymerization reaction.

With reference of FIG. 1, it will be understood that the monomer, dye and triorgano-substituted phosphine or arsine may be brought together simultaneously or in any other order. Thus, the monomer and dye may be prepared together and the triorgano-substituted phosphine or arsine may be added later thereto. Alternatively, the dye and the triorgano-substituted phosphine or arsine may be prepared together and the monomer later added thereto. It is also possible in some instances to prepare the monomer and the triorgano-substituted phosphine or arsine together and later add the dye thereto, or provide suitable mixtures of different combinations of the defined photo-oxidants with one or more of the catalyst material in photopolymerizable material system.

The photopolymerization process of the present invention may be carried out in a solvent solution of the involved compounds. The particular solvent employed will depend upon the solubility of the monomer on one hand and the photo-redox catalyst system on the other. Thus, if both the monomer and the catalyst system are water soluble, such as in a system employing, for example, acrylamide as the monomer, and thionine as the dye, and tributylphosphine, an aqueous solution may be employed. Where a common solvent for the monomer and catalyst system is not available, different solvents which are miscible with each other may be employed. I have used as suitable solvents in the process of the present invention water, alcohols, polyhydric alcohols, ethers derived from polyhydric alcohols, ethyl ether, dioxane, ethylene dichloride, toluene, benzene and the like. Furthermore, I have found glycerol, ethylene glycol, bis(2-methoxyethyl) ether or methanol to be useful in the process of the present invention as a solvent.

Dispersions may also be used in effecting the photopolymerization and resort to dispersions may be had where it is desirable to use an insoluble monomer or catalyst system. In general, however, I prefer not to use dispersions since the particulate matter tends to scatter the light or radiation used in the process of the present invention.

The temperature at which the reaction is carried out is not critical. However, it will be appreciated that since polymerization of some of the monomers which may be employed in the process of the present invention may be achieved by heating the monomer at an elevated temperature, restricting the reaction to photo-redox polymerization may be difficult if excessively high temperatures are employed or encountered.

The photopolymerization process of the present invention has particular utility wherever it is desired to quickly form a hard, solid and/or permanent substance under the control of and in response to radiation. Thus, polymers having a desired predetermined shape may be formed by exposing the reaction mixture to a light pattern corresponding to the predetermined shape. I have also achieved the formation of photographic images by exposing a reaction mixture to a light image of a subject, the reaction mixture being disposed upon a film or suitable substrate therefor. After light-induced polymerization is achieved according to the invention, any unreacted monomer as well as other constituents of the reaction mixture which have not been irradiated may be inactivated or rendered insensitive to further photo-activation in some appropriate manner as by removing the unreacted compounds by dissolution in an appropriate solvent.

In order that any addition polymerization system attain a maximum degree of conversion in a given time, it is necessary that agents which tend to inhibit initiation or polymerization be removed or that their concentration be substantially reduced. Oxygen is known to react readily with free radicals and thus tends to inhibit addition polymerization. Although, as noted hereinbefore, the photo-redox catalyst system of the present invention appears to be substantially less sensitive to inhibition by oxygen than many catalyst systems disclosed in the prior art, considerable improvement of the over-all rate of polymerization in the process of the present invention can be achieved by the total elimination of oxygen or by the reduction of the oxygen content of the polymerizing materials to a substantially low concentration.

I have found that with the triorgano-substituted phosphines and arsines of the present invention, and in particular with the phosphines, that a peculiar side reaction may occur with the organic dye, resulting in a profound change in the absorption frequency of the dye. I have found that this side reaction can be suppressed or reversed by the addition of an acid to the photo-redox catalyst system. Therefore, it is of importance to this invention that, where said side reaction occurs, the composition be acidified with a suitable acid such as hydrochloric acid, acetic acid, sulfuric acid and the like. For example, the reaction of tributylphosphine with thionine changes the color of the reaction mixture from a blue to a deep red. The addition of an acid returns the color to the original blue of the thionine. The deep red form is completely non-light-sensitive whereas the original blue or the acidified blue form is highly light-sensitive.

It should be clearly understood that the foregoing listing of monomers, dyes and triorgano-substituted phosphine or arsine catalysts are by no means intended to be exhaustive of the compounds and materials that may be employed in the practice of the invention. The following examples are also intended to illustrate the practice of my invention and not to restrict the scope thereof.

EXAMPLE 1

Solution A

A monomer solution was prepared by dissolving 40 grams of acrylamide, 6 grams of N,N'-methylenebisacrylamide and 2.5 milligrams of thionine in a buffer solution made from disodium hydrogen phosphate and citric acid so as to have a pH of about 8. The solution was made up to 100 ml. by the addition of more buffer solution. The resulting solution was about $10^{-4}$ molar in the dye.

Solution B

A photosensitive solution was prepared by adding 0.2 milligram of tributylphosphine to about 5 ml. of the above solution (A) in a vial. The vial was then closed and nitrogen was bubbled through the solution (B) in the dark for about three minutes to reduce the oxygen content thereof. The vial was then exposed to the light of a room illuminated with fluorescent bulbs. The solution (B) set up to a gel in about 12 seconds and became hard in a few minutes. Not all of the tributyl phosphine dissolved in the solution (B) and remained as droplets in the vial. After gelation of the solution (B), a moderately strong exothermic reaction ensued with heating of the vial and the sensitizing dye bleached out completely.

EXAMPLE 2

Solution A

A monomer solution was made by mixing 3.5 gms. of acrylamide, 0.5 gm. of N,N'-methylenebisacrylamide, and 3 ml. of tetrahydrofurfuryl alcohol in a 10 ml. volumetric flask and warmed gently on a hot plate to obtain a clear solution. More tetrahydrofurfuryl alcohol was added to bring the solution up to 10 ml. and stirring and warming was continued until a clear, colorless homogeneous solution was secured.

Solution B

A light-sensitive solution was prepared in the dark by adding sufficient thionine to 2 ml. of solution (A) to give $10^{-4}$ molar concentration of thionine as determined colorimetrically. Then, 0.1 ml. of tributylphosphine was added. Very quickly the blue-colored solution changed to a deep red-colored solution. The solution (B) was placed in a vial and a stream of nitrogen gas was bubbled through the solution for ten minutes. The solution was exposed to white light having an intensity of about $10^{-4}$ watts/cm.$^2$ at the solution surface. No polymerization occurred in fifteen minutes. The solution (B) was then exposed to white light having an intensity of about $10^{-2}$ watts/cm.$^2$ at the solution surface. No polymerization occurred in five minutes. Then, in the dark, a single drop of 3 N HCl solution was added to the solution (B) in the vial. The deep red color immediately returned to a blue color. The thus-acidified solution (B) was again exposed to white light having an intensity of about $10^{-2}$ watts/cm.$^2$ at the solution surface whereupon the acidified solution (B) clouded and gelled in five seconds. After storage in the dark for one week, the acidified solution (B) was exposed to white light having an intensity of about $10^{-3}$ watts/cm.$^2$ at the solution surface, and was observed to cloud and gel in 39.2 seconds.

EXAMPLE 3

Solution A

A monomer solution was made by mixing 35 gms. of acrylamide and 5 gms. of N,N'-methylenebisacrylamide in a 100 ml. volumetric flask to which was added tetrahydrofurfuryl alcohol to bring the volume up to 100 ml. The mixture was stirred and warmed until a clear, colorless homogeneous solution (A) was obtained.

Solution B

A light-sensitive solution was made in the dark by adding .03 gm. triphenylphosphine to 2 ml. of solution (A) and sufficient thionine was added to give a $10^{-4}$ molar concentration as determined colorimetrically. A homogeneous solution (B) was obtained by stirring and then placed in a vial through which nitrogen gas was bubbled for about one hour. The solution (B) was then exposed to white light having an intensity of about $10^{-4}$ watts/cm.$^2$ at the solution surface. The solution clouded and gelled in 76 seconds. However, on storing in the dark for about two hours the color of the unexposed solution changed from a blue to a deep red. Addition of a drop of 3 N HCl brought the color back to the original blue.

EXAMPLE 4

Sufficient thionine was added to 12 ml. of solution (A) in Example 3 to obtain a $5 \times 10^{-4}$ molar concentration as determined colorimetrically. About 0.03 gm. of triphenylarsine was then added and the mixture was stirred to obtain a homogeneous solution. The solution remained blue in color no matter how long it was stored in the dark. The solution was placed in three vials and each vial was exposed to a different light intensity. With a white light intensity of about $10^{-4}$ watts/cm.$^2$ at the solution surface, the solution clouded and gelled in 930 seconds. With a white light intensity of about $10^{-3}$ watts/cm.$^2$ at the solution surface, the solution clouded and gelled in 112.5 seconds. With a white light intensity of about $10^{-2}$ watts/cm.$^2$ at the solution surface, the solution clouded and gelled in 35.8 seconds.

EXAMPLE 5

Sufficient thionine was added to 10 ml. of solution (A) in Example 3 to obtain a $5 \times 10^{-4}$ molar concentration as determined colorimetrically. About 0.03 gm. of triphenylarsine was then added and nitrogen gas was bubbled through the solution in the dark for one hour. The solution was exposed to white light having an intensity of about $10^{-3}$ watts/cm.$^2$ at the solution surface. The solution clouded and gelled in 78.2 seconds.

EXAMPLE 6

Solution A

A monomer solution was prepared by mixing 17.5 gms. of acrylamide and 2.5 gms. of N,N'-methylenebisacrylamide in a 50 ml. volumetric flask to which was added a solvent consisting of 75 percent by volume of tetrahydrofurfurylalcohol and 25 percent water to bring the solution up to 50 ml. After stirring and warming, a clear, colorless, homogeneous solution was obtained.

Solution B

A light-sensitive solution was made in the dark by adding 0.03 gm. triphenylphosphine to solution (A) and sufficient thionine along with about 0.1 ml. of acetic acid to give about a $10^{-4}$ molar concentration of thionine. The solution remained blue indefinitely upon storage in the dark. Part of the solution was placed in a vial and exposed to white light having an intensity of about $10^{-3}$ watts/cm.$^2$ at the solution surface. The solution clouded and gelled in 4.3 seconds.

EXAMPLE 7

Solution A

A solution was made by adding 0.5 gm. of triphenylphosphine to 25 ml. of solution (A) in Example 6. Not all of the triphenylphosphine dissolved on stirring. 0.5 gm. of glacial acetic acid was then added to the solution and, after standing for two days, a clear, colorless homogeneous solution (A) was secured which showed no tendency to polymerize or gel.

Solution B

A light-sensitive solution was made in the dark by mixing 12 ml. of solution (A) with sufficient thionine to give a $10^{-3}$ molar concentration as determined colorimetrically. The color of the solution (B) remained blue on storage in the dark. The solution was divided amongst several vials. One solution was immediately exposed to white light having an intensity of about $10^{-3}$ watts/cm.$^2$ at the solution surface. The solution clouded and gelled in 32.3 seconds. Another vial was stored in the dark for two days, then exposed to the same light. This solution clouded and gelled in 36.6 seconds.

EXAMPLE 8

Solution A 2.62 gms. of triphenylphosphine were placed in a 100 ml. volumetric flask with 0.6 gm. of acetic acid. Then isopropyl alcohol was added to bring the solution up to 100 ml. After stirring, a homogeneous solution (A) was secured.

Solution B

A light-sensitive solution was prepared by adding 4 ml. of barium diacrylate aqueous solution containing 0.5 gm. barium diacrylate per ml. of solution to 4 ml. of solution (A). Sufficient thionine was added to give about a $5 \times 10^{-4}$ molar concentration. The solution (B) was thoroughly stirred but remained slightly hazy. The solution was placed in a vacuum jar whereupon about 3 gms. in weight was lost by evaporation. The weight loss was probably mostly due to evaporation of the isopropyl alcohol. The solution was still hazy so it was filtered through a plug of glass wool by gravity in the dark. The solution was then poured onto a glass plate having a peripheral plastic spacer 6 mils thick. Another glass plate was sealed down to form a cell consisting of a 6 mils-thick film of light-sensitive composition between glass plates. This assembly was exposed to white light having an intensity of about $10^{-2}$ watts/cm.$^2$ at the cell surface and a series of exposure times was used ranging from 0.1 to 0.6 second. After the exposures, the optical density of the exposed areas and the unexposed background was measured on a densitometer. After substracting the optical density of the unexposed background from the optical density of the various exposed areas, the graph shown in FIG. 2 was drawn to show the variation of optical density with exposure for the composition of this example. It will be noted that for this range of exposure times the optical density variation is essentially linear.

EXAMPLE 9

A light-sensitive composition was prepared in the dark by mixing 4 ml. of aqueous barium diacrylate solution containing 0.5 gm. of barium diacrylate per ml., 4 ml. of 0.1 molar solution of triphenylarsine in isopropyl alcohol and 1 ml. of $10^{-3}$ molar aqueous thionine solution. A slightly hazy solution was secured which was placed in a vacuum jar under vacuum and 2.6 gms. of the solvent was removed. The hazy solution was then gravity-filtered through a plug of glass wool and the clear solution was poured onto a glass plate having a 6 mils-thick plastic peripheral spacer. Another glass plate was sealed down to form a sandwiched cell consisting of a 6 mils-thick film of light-sensitive composition between two glass plates. The film was exposed to a spot of white light having an intensity of about $10^{-2}$ watts/cm.$^2$ at the film surface. In ten seconds an opaque spot was obtained in the film having an optical density of 0.85.

EXAMPLE 10

A light-sensitive composition was prepared by mixing in the dark 4 ml. of aqueous barium diacrylate solution containing 0.5 gm. of barium diacrylate per ml., 4 ml. of 0.1 molar solution of triphenyl arsine in isopropyl alcohol, and 1 ml. of $10^{-3}$ molar aqueous methylene blue solution. A somewhat hazy solution was secured which was placed in a vacuum jar under vacuum and 2.2 gms. of the solvent was removed. The hazy solution was gravity-filtered through a plug of glass wool and the clear filtrate was placed on a glass plate having a 6 mils-thick plastic peripheral shim. Another glass plate was sealed down to form a cell consisting of a 6 mils-thick film of light-sensitive composition sandwiched between two glass plates. The film was exposed to a spot of white light having an intensity of about $10^{-2}$ watts/cm.$^2$ at the film surface. In fifteen seconds, an opaque spot was secured which had an optical density of 0.44.

EXAMPLE 11

A light-sensitive composition was prepared in the dark by mixing 4 ml. of aqueous barium diacrylate solution containing 0.5 gm. of barium diacrylate per ml., 4 ml. of isopropyl alcohol solution containing 0.1 molar triphenylphosphine and 0.1 molar acetic acid, and 1 ml. of $10^{-3}$ molar aqueous thionine solution. The slightly hazy solution was placed in a vacuum jar under vacuum and 2.4 gms. of solvent was removed. The hazy solution was then gravity-filtered through a plug of glass wool and the clear solution poured onto a glass plate having a 6 mils-thick plastic peripheral spacer. A second glass plate was sealed down on this assembly to form a cell consisting of a 6 mils-thick film of light-sensitive composition sandwiched between glass plates. The light-sensitive film was exposed to a projected negative with white light having an intensity of about $10^{-2}$ watts/cm.$^2$ at the sample surface. An exposure time of five seconds produced a clear, sharp, positive reproduction of the negative image.

Having described and illustrated the present embodiment of this invention, improvement and/or discovery in the art in accordance with the patent statutes, it will be apparent that some modifications and variations including mixtures of the embodied components, as claimed, may be made without departing from the spirit and scope thereof. The specific embodiments described are given by way of examples illustrative of the changes and improvement discovered applicable herein and which are to be construed or limited only by the terms of the appended claims.

What is claimed is:

1. The process of photopolymerizing a photopolymerizable vinyl system which is inactive in the dark and contains:
    (a) a photopolymerizable vinyl monomer in combination with
    (b) a photo activatable catalyst system comprised of:
        (1) an organic photo-oxidant dye having an oxidation potential active to radiation absorbed from ambient light in the visible portion of the spectrum over the wavelength range of from about 3800 A. to about 7200 A. to form an activated, oxidant, electron acceptor state and being selected from compounds of the formula

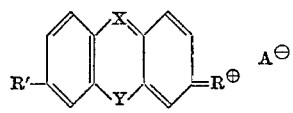

where R carries a positive charge and is an imonium, alkylimonium, dialkylimonium or oxonium group; R' is hydrogen or an amino, alkylamino, dialkylamino, or hydroxyl groups; X is nitrogen or substituted carbon; Y is sulfur, oxygen or substituted nitrogen; and A$^\ominus$ is an anion; in combination with
        (2) an organic compound capable of reacting with said dye when in said activated state to generate free radicals for initiating polymerization of said vinyl monomer and being selected from at least one of the group consisting of triorgano-substituted phosphine and triorgano-substituted arsine
which comprises exposing said system to absorb radiations in said wavelength range for a period sufficient to effect visible solid state polymerization in said system.

2. The process according to claim 1 wherein said dye comprises a phenothiazine dye present in said system in an amount from $10^{-7}$ molar to $10^{-2}$ molar.

3. The process according to claim 1 wherein said dye is selected from the group consisting of methylene blue, thionine, azure B, rose bengal, phenosafranine, acridine orange, riboflavin, fluorescein, erythrosin B, safranine O, pyronine B, capri blue, azure A, and resorufin.

4. The process according to claim 1 where the organic compound is one of the formula:

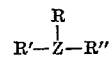

where Z is P or As and R, R' and R" are selected from the group consisting of alkyl, aryl, aralkyl and alkaryl groups.

5. The process according to claim 1 wherein said photo-oxidant dye material is selected from one or more of the family of phenothiazine dyes, phenazine dyes, phenoxazine dyes, acridine dyes, pyronine dyes, and xanthene dyes.

6. The process according to claim 1 wherein a cross-linking monomer is utilized in conjunction with said vinyl monomer.

7. The process according to claim 6 wherein said vinyl and cross-linking monomers have an average functionality greater than two.

8. A photopolymerizable vinyl monomer system inactive in the dark and containing a photo-redox catalyst for photopolymerizing said vinyl monomer over the visible light range of about 3800 A. to about 7200 A., said catalyst comprising:
    (a) a photo-oxidant having the formula:

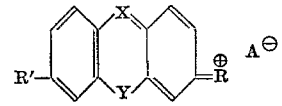

where R carries a positive charge and is an imonium, alkylimonium, dialkylimonium, or oxonium group; R' is hydrogen, or an amino, alkylamino, dialkylamino, or hydroxyl group; X is nitrogen or substituted carbon; Y is sulfur, oxygen or substituted nitrogen; and A$^\ominus$ is an anion, and
    (b) at least one organic compound selected from the group consisting of triorgano substituted arsine and triorgano-substituted phosphine capable therewith of effecting visible solid state polymerization of vinyl monomers in said system.

9. A system according to claim 8 wherein said photo-oxidant is selected from the group consisting of phenothiazine, phenazine, phenoxazine, acridine, pyronine and xanthene dyes.

10. A system according to claim 9 in which said dye is a phenothiazine dye present in an amount of from about $10^{-7}$ molar to $10^{-2}$ molar.

11. A system according to claim 8 in which the organic compound is selected from compounds of the formula:

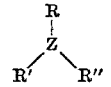

where Z is P or As and R, R' and R" are selected from the group consisting of alkyl, aryl, aralkyl and alkaryl.

12. A system according to claim 8 in which said dye is selected from the group consisting of methylene blue, thionine, azure B, rose bengal, phenosafranine, acridine orange, riboflavin, fluorescein, erythrosin B, safranine O, pyronine B, capri blue, azure A, and resorufin.

13. A system according to claim 12 in which said dye is thionine.

14. A system according to claim 8 in which the vinyl monomer has an average functionality of at least 2.

References Cited

UNITED STATES PATENTS

| | | | |
|---|---|---|---|
| 3,352,772 | 11/1967 | Mao | 204—159.23 |
| 3,331,761 | 7/1967 | Mao | 204—159.23 |
| 3,097,096 | 7/1963 | Oster | 96—30 |
| 3,047,422 | 7/1962 | Sites et al. | 117—93 |
| 2,875,047 | 2/1959 | Oster | 204—159.23 |

SAMUEL H. BLECH, Primary Examiner

R. B. TURER, Assistant Examiner

U.S. Cl. X.R.

96—115 P; 204—159.23; 252—426, 431